(12) United States Patent
Moritoki

(10) Patent No.: US 8,327,069 B2
(45) Date of Patent: Dec. 4, 2012

(54) STORAGE SYSTEM AND STORAGE CONTROL APPARATUS PROVIDED WITH CACHE MEMORY GROUP INCLUDING VOLATILE MEMORY AND NONVOLATILE MEMORY

(75) Inventor: Naoki Moritoki, Oi (JP)

(73) Assignee: Hitachi, Ltd., Tokyo (JP)

( * ) Notice: Subject to any disclaimer, the term of this patent is extended or adjusted under 35 U.S.C. 154(b) by 546 days.

(21) Appl. No.: 12/666,932

(22) PCT Filed: Dec. 8, 2009

(86) PCT No.: PCT/JP2009/006702
§ 371 (c)(1),
(2), (4) Date: Dec. 28, 2009

(87) PCT Pub. No.: WO2011/070611
PCT Pub. Date: Jun. 16, 2011

(65) Prior Publication Data
US 2012/0017033 A1    Jan. 19, 2012

(51) Int. Cl.
*G06F 12/00* (2006.01)
*G06F 13/00* (2006.01)
*G06F 13/28* (2006.01)
*G06F 11/00* (2006.01)
(52) U.S. Cl. . 711/119; 711/118; 711/162; 711/E12.103; 714/14
(58) Field of Classification Search .......... None
See application file for complete search history.

(56) References Cited

U.S. PATENT DOCUMENTS 5,640,530 A * 6/1997 Beardsley et al. ............ 711/113
5,987,569 A * 11/1999 Takahashi et al. ............ 711/119
(Continued)

FOREIGN PATENT DOCUMENTS
EP      2 040 168 A2    3/2009
(Continued)

OTHER PUBLICATIONS

PCT International Search Report on application No. PCT/JP2009/006702 dated Aug. 16, 2010; 2 pages.

*Primary Examiner* — Edward Dudek, Jr.
*Assistant Examiner* — Matthew Chrzanowski
(74) *Attorney, Agent, or Firm* — Foley & Lardner LLP

(57) ABSTRACT

A storage system is provided with a plurality of physical storage devices and a storage control apparatus that is coupled to the plurality of physical storage devices. The storage control apparatus is provided with a first cache memory group provided with a first volatile memory and a first nonvolatile memory and a second cache memory group provided with a second volatile memory and a second nonvolatile memory. The storage control apparatus executes a double write for writing the write target data from the host device to both of the first volatile memory and the second volatile memory, and notifies the host device of the write completion in the case in which the double write is completed. The storage control apparatus backs up data from the first volatile memory to the first nonvolatile memory while an electrical power is supplied from the primary power source. The storage control apparatus backs up data from the second volatile memory to the second nonvolatile memory while an electrical power is supplied from the secondary power source to the second volatile memory in the case in which an electrical power supply from the primary power source is stopped.

17 Claims, 13 Drawing Sheets

U.S. PATENT DOCUMENTS

| | | |
|---|---|---|
| 7,243,190 B2 * | 7/2007 | Ash et al. ....................... 711/113 |
| 2005/0080762 A1 * | 4/2005 | Nakashima et al. ............... 707/1 |
| 2005/0193242 A1 * | 9/2005 | Ash et al. .......................... 714/8 |
| 2006/0020855 A1 * | 1/2006 | Okada et al. ..................... 714/14 |
| 2008/0104344 A1 * | 5/2008 | Shimozono et al. ........... 711/162 |
| 2008/0189484 A1 * | 8/2008 | Iida et al. ....................... 711/114 |
| 2008/0244183 A1 * | 10/2008 | Ishikawa et al. ............... 711/129 |
| 2009/0132760 A1 * | 5/2009 | Flynn et al. .................... 711/113 |
| 2010/0293331 A1 * | 11/2010 | Fujii et al. ..................... 711/119 |
| 2011/0022801 A1 * | 1/2011 | Flynn ............................. 711/120 |

FOREIGN PATENT DOCUMENTS

| | | |
|---|---|---|
| EP | 2 0404 168 A2 | 3/2009 |
| JP | 2001-290608 A | 10/2001 |

* cited by examiner

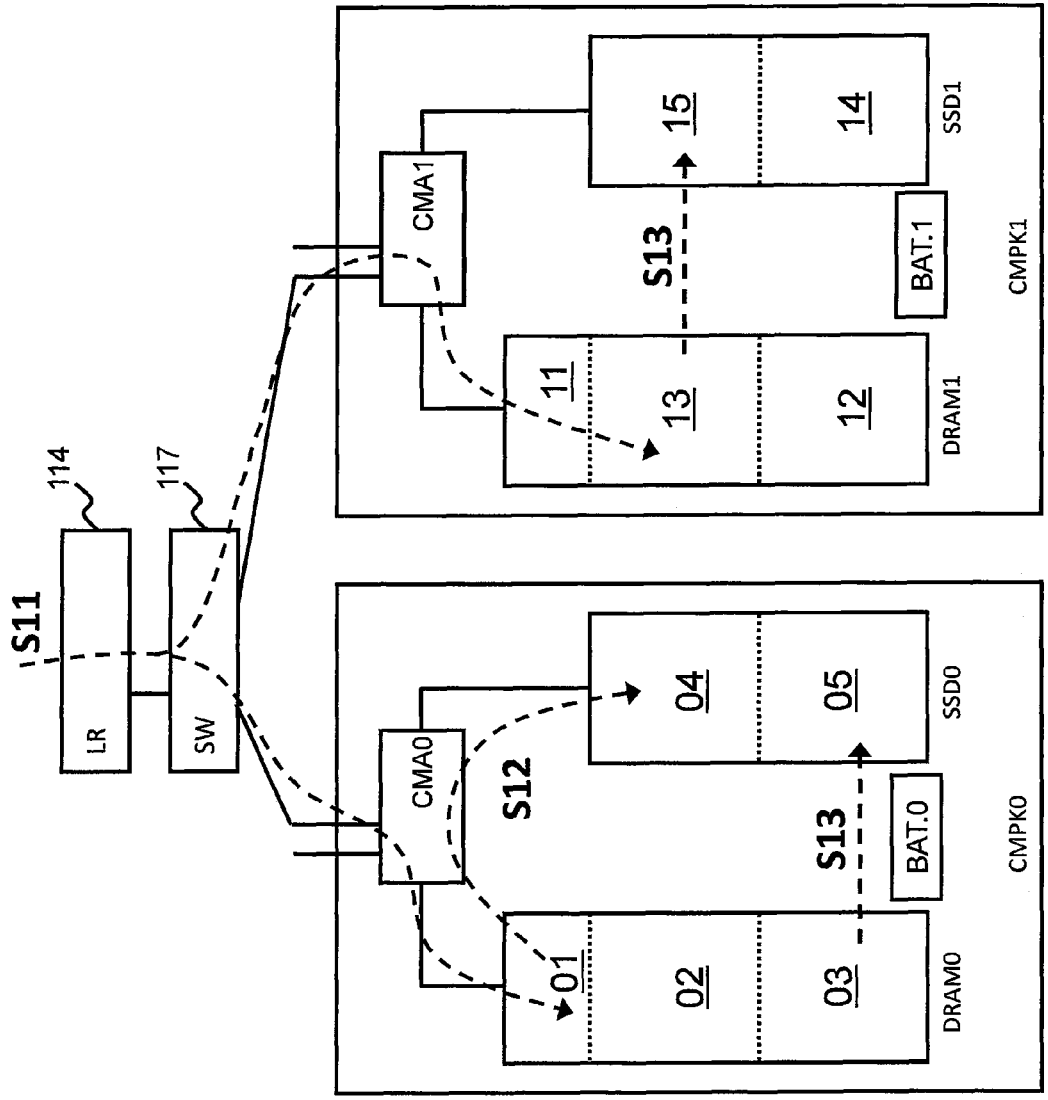

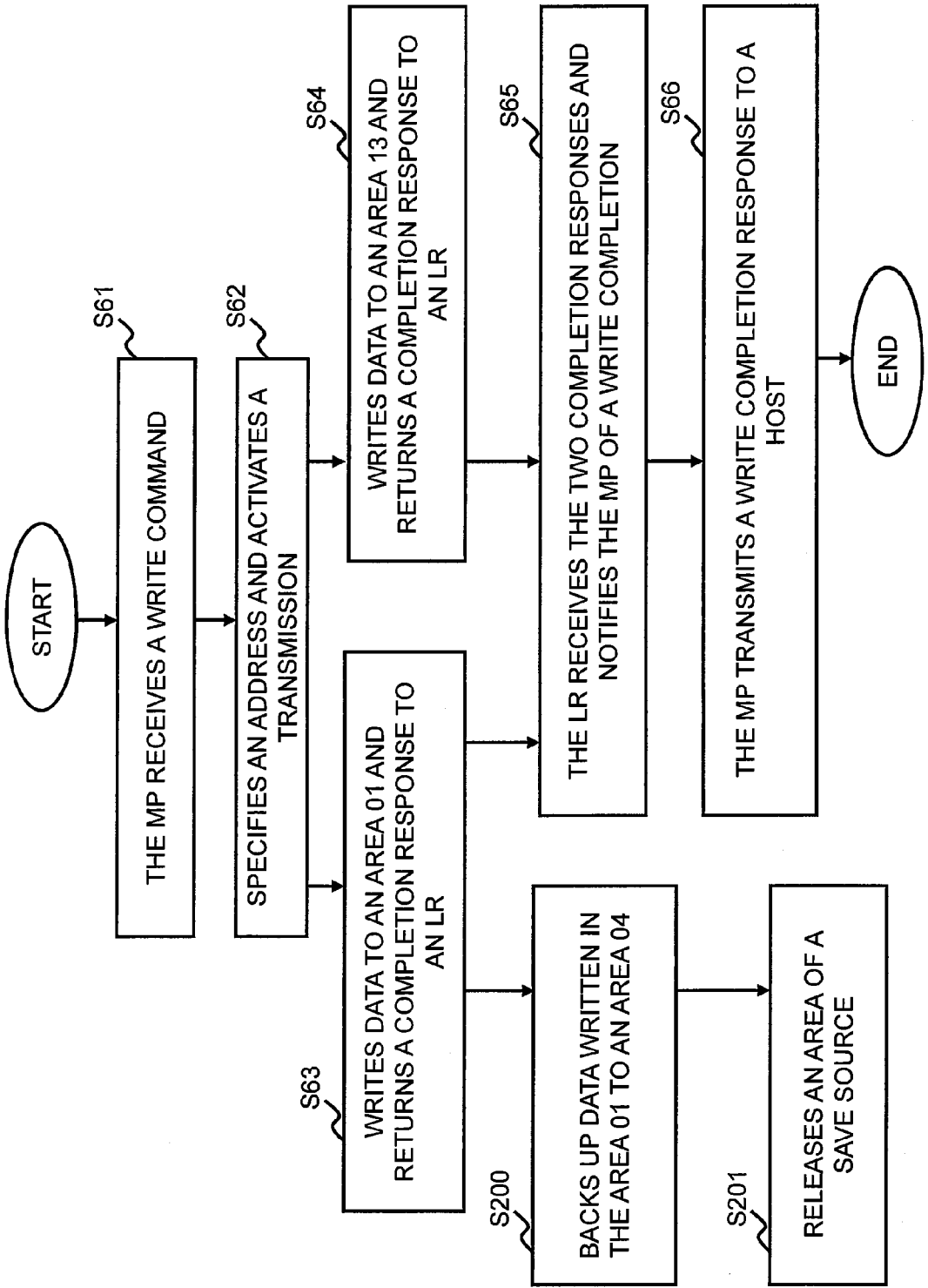

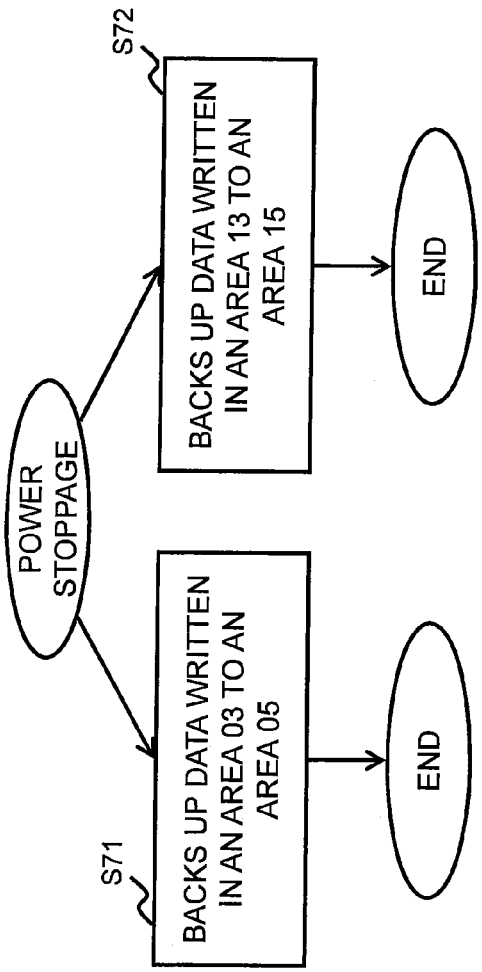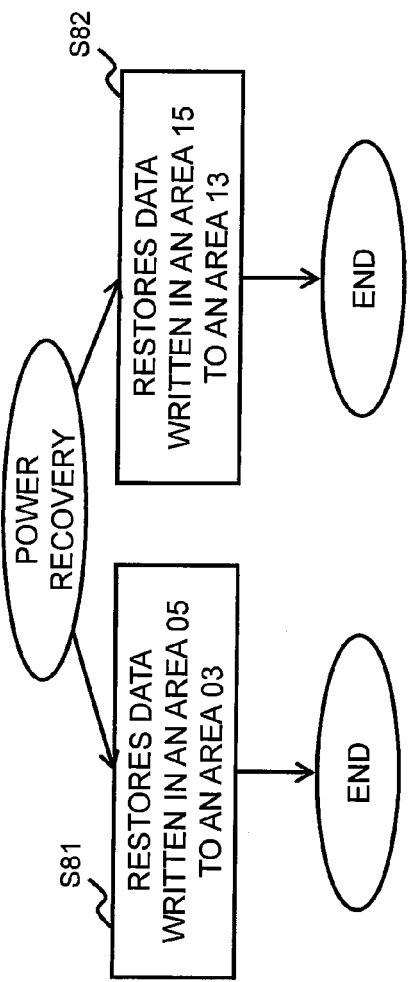

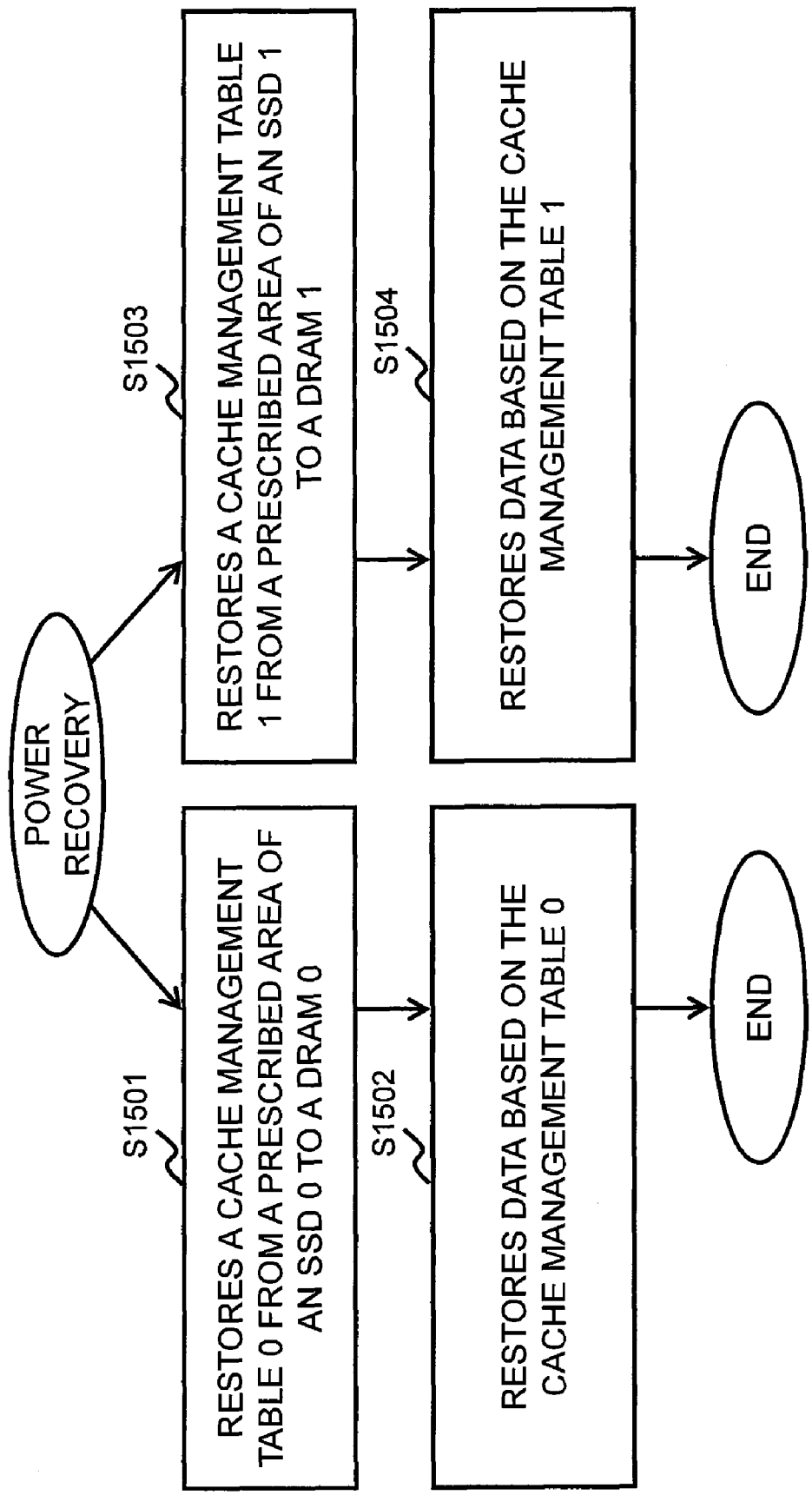

STORAGE SYSTEM AND STORAGE CONTROL APPARATUS PROVIDED WITH CACHE MEMORY GROUP INCLUDING VOLATILE MEMORY AND NONVOLATILE MEMORY

TECHNICAL FIELD

The present invention generally relates to a storage system and a storage control apparatus provided with a cache memory.

BACKGROUND ART

PTL 1 discloses a disk control device provided with a shared memory. In accordance with PTL 1, only a part of the shared memory is composed of a nonvolatile shared memory phase, thereby reducing difficulties in a circuit configuration and a cost.

CITATION LIST

Patent Literature

[PTL 1]
Japanese Patent Application Laid-Open Publication No. 2001-290608

SUMMARY OF INVENTION

Technical Problem

For instance, even in the case in which an electrical power supply from a primary power source to a volatile memory is stopped, an electrical power is supplied from a secondary power source to a volatile memory. By backing up data that has been stored into a volatile memory to a nonvolatile memory during the power supply, even in the case in which the data that has been stored into the volatile memory is erased, the data remains in the nonvolatile memory.

However, in the case in which a failure occurs in the nonvolatile memory after the backup is completed, there is a possibility that the data that has been stored into the nonvolatile memory is also deleted.

Moreover, in the case in which an amount of data that is backed up during a power supply from a secondary power source is large, a capacity of the secondary power source must be enlarged.

An object of the present invention is to prevent the backup data from being lost even in the case in which a failure occurs in the nonvolatile memory after the backup is completed and to suppress a capacity of the secondary power source that supplies an electrical power to a volatile memory as substitute for a primary power source.

Solution to Problem

A storage system is provided with a plurality of physical storage devices and a storage control apparatus that is coupled to the plurality of physical storage devices. The storage control apparatus is provided with a first cache memory group that includes a first volatile memory and a first nonvolatile memory and a second cache memory group that includes a second volatile memory and a second nonvolatile memory. The storage control apparatus executes a double write for writing the write target data from a host device to the both of a first volatile memory and a second volatile memory. In the case in which the double write is completed, the storage control apparatus notifies the host device of a write completion. The storage control apparatus backs up the data from the first volatile memory to the second volatile memory while an electrical power is supplied from a primary power source. In the case in which the power supply from the primary power source is stopped, the data is backed up from the second volatile memory to the second nonvolatile memory while an electrical power is supplied from a secondary power source to the second volatile memory.

In accordance with the present invention, since the data is backed up to both of the first nonvolatile memory and the second nonvolatile memory, the data can remain in one of the first nonvolatile memory and the second nonvolatile memory even in the case in which a failure occurs in the other of the first nonvolatile memory and the second nonvolatile memory after the backup is completed. Moreover, in accordance with the present invention, since the data is backed up to from the first volatile memory to the first nonvolatile memory during a power supply from a primary power source, it is unnecessary to back up the data from the first volatile memory in the case in which the power supply from the primary power source is stopped, whereby a capacity of the secondary power source can be suppressed as a whole.

BRIEF DESCRIPTION OF DRAWINGS

FIG. 5 shows a flow of a double write and a backup in accordance with the embodiment 1.
FIG. 6 is a flowchart showing a double write to the CMPK 0 and the CMPK 1 and an asynchronous backup during a power distribution.
FIG. 7 is a flowchart showing a backup during a power stoppage in accordance with the embodiment 1.
FIG. 8 is a flowchart showing a restore during a power recovery in accordance with the embodiment 1.
FIG. 14 is a flowchart showing a restore during a power recovery in accordance with the embodiment 3.

DESCRIPTION OF EMBODIMENTS

The storage systems in accordance with some embodiments of the present invention will be described below in detail with reference to the drawings.

Embodiment 1

Figure 1:
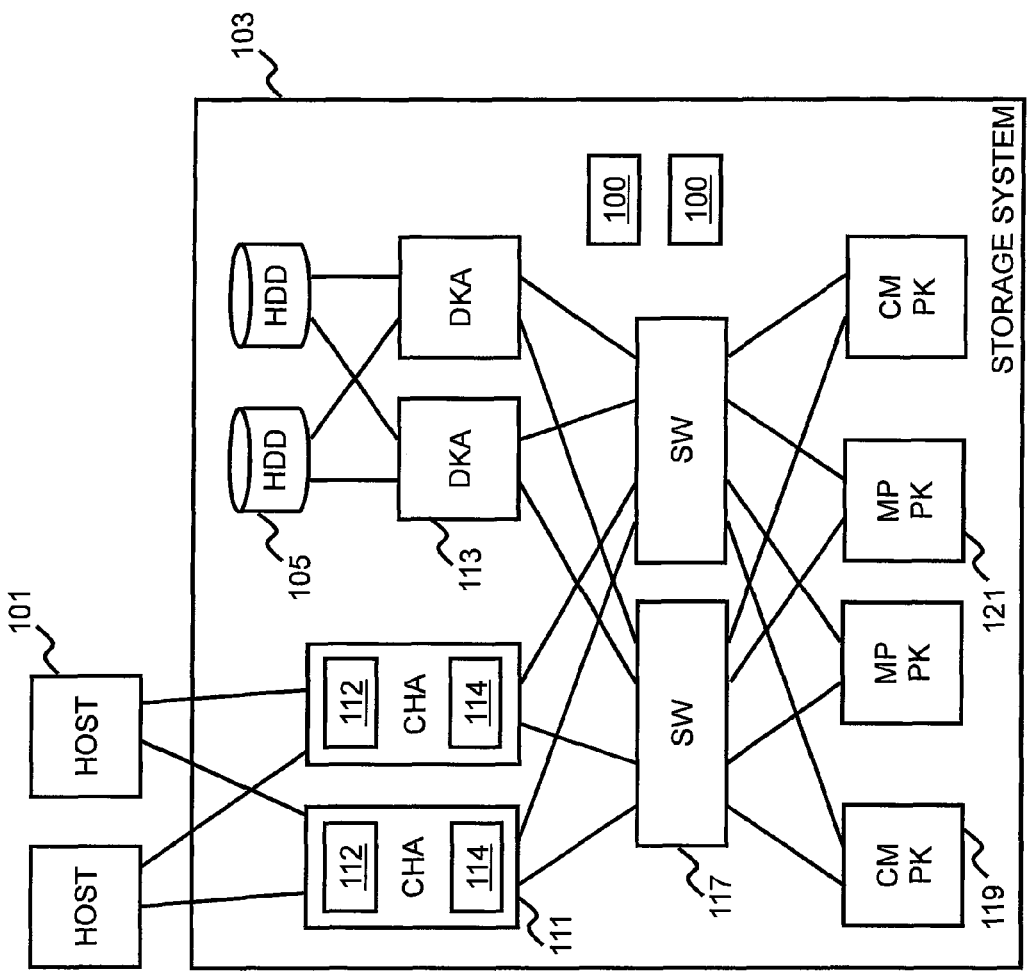
FIG. 1 shows a configuration of a storage system in accordance with an embodiment 1 of the present invention.

FIG. 1 shows a configuration of a storage system in accordance with an embodiment 1 of the present invention.

A storage system 103 is provided with a plurality of HDDs (Hard Disk Drives) 105, a storage control apparatus that is coupled to the plurality of HDDs 105, and a power supply unit 100. As substitute for the HDD 105, a physical storage device of other kinds such as an SSD (Solid State Drive) can also be adopted.

The storage control apparatus is provided with a controller and a plurality of cache memory packages (CMPK) 119 that are coupled to the controller. The controller is provided with a plurality of channel adapters (CHA) 111, a plurality of disk adapters (DKA) 113, a plurality of microprocessor packages (MPPK) 121, and a plurality of switches (SW) 117. There are a plurality of CHAs 111, a plurality of DKAs 113, a plurality of MPPKs 121, a plurality of SWs 117, and a plurality of power supply units 100 from the aspect of a redundancy. The number of at least one of them is not restricted to two shown in the figure and can be larger or less than two. The number of CMPKs 119 can also be larger than two.

The power supply unit 100 supplies an electrical power based on an electrical power from a commercial power source to each of packages 119, 111, 113, 121, and 117.

The CHA 111 is an interface device that is coupled to a host device (HOST) 101. The CHA 111 receives an I/O command (a write command or a read command) provided with the I/O (Input/Output) destination information from the HOST 101, and transmits the received I/O command to any of the plurality of MPPKs 121. For instance, the I/O destination information includes an ID of a logical storage device (for instance, a LUN (Logical Unit Number)) and an address of an area for the logical storage device (for instance, an LBA (Logical Block Address)). The HOST 101 is a computer in general. However, the HOST 101 can also be another storage system as substitute for a computer.

The CHA 111 is provided with a protocol chip 112 and an LR (Local Router) 114. The protocol chip 112 executes a protocol conversion for a communication with the HOST 101. The LR 114 transmits the received I/O command to the MPPK 121 corresponded to an I/O destination that is specified by the I/O destination information that is included in the I/O command.

The DKA 113 is an interface device that is coupled to the HDD 105. The DKA 113 reads data from the HDD 105, transmits the data to a DRAM (Dynamic Random Access Memory) of the CMPK 119, and writes data from the CMPK 119 to the HDD 105.

The MPPK 121 is a device provided with one or a plurality of microprocessors (MP). The MP processes an I/O command that is transmitted from the CHA 111.

A plurality of packages, that are the CHA 111, the DKA 113, the CMPK 119, and the MPPK 121, are coupled to the SW 117. The SW 117 controls a connection between packages (PK).

Figure 2:
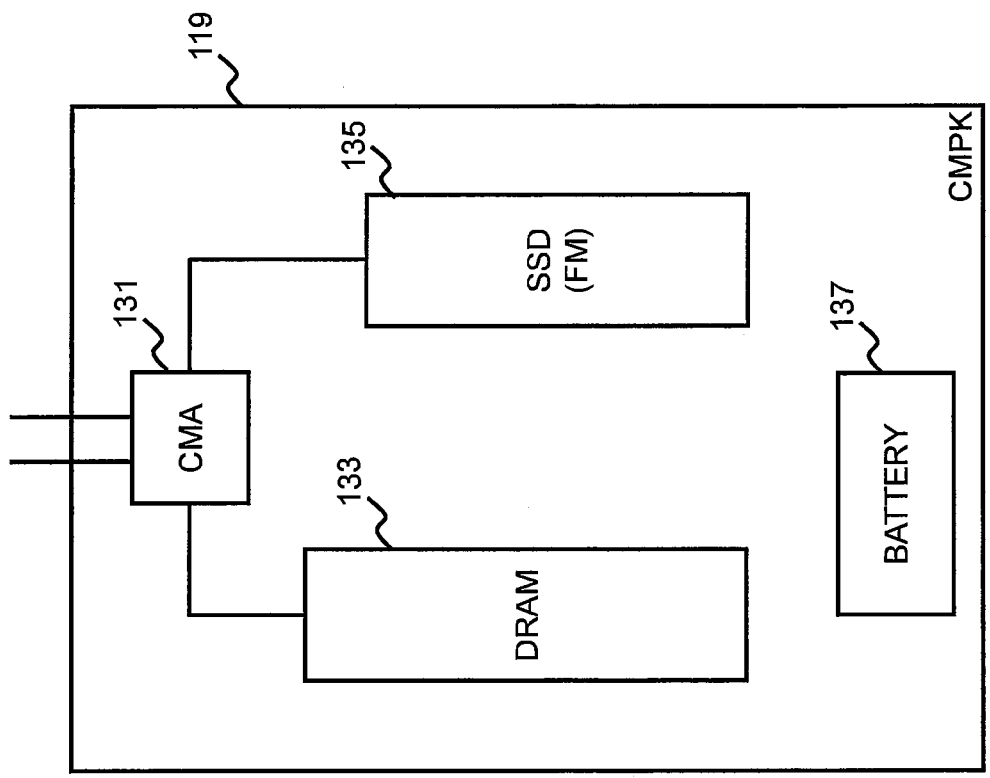
FIG. 2 shows a configuration of a cache memory package (CMPK).

The CMPK 119 is an example of a cache memory group provided with a volatile memory and a nonvolatile memory. In the present embodiment, the configuration of the CMPK 119 is shown in FIG. 2. More specifically, the CMPK 119 is provided with a CMA (cache memory adapter) 131, a DRAM (Dynamic Random Access Memory) 133, an SSD (Solid State Drive) 135, and a battery 137. The CMA 131 is an interface device to the DRAM 133 and the SSD 135 (for instance, an LSI (Large Scale Integration)), and is coupled to two or more SW (redundant SW) 117. The DRAM 133 is a kind of a volatile memory, to which an electrical power is supplied from the power supply unit 100. The DRAM 133 is provided with an area that is used as a cache memory (hereafter referred to as a cache area). The SSD 135 is a kind of a nonvolatile memory, to which data is backed up from the DRAM 133 during a power stoppage (in the case in which a power supply from the power supply unit 100 to the DRAM 133 and the CMA 131 is stopped) (in other words, in the case in which a power stoppage occurs, the occurrence of a power stoppage is detected, and data is backed up from the DRAM 133 to the SSD 135). The battery 137 supplies an electrical power to the DRAM 133 and the CMA 131 during a power stoppage.

One of the two CMPKs 119 is referred to as a CMPK 0, and the other is referred to as a CMPK 1 in the following. In the case in which the two CMPKs 119 are not distinguished in particular, the two CMPKs 119 are referred to as a CMPK x (x=0 or 1). In the case in which an element of the CMPK x is referred to, x is added to the name of the element. For instance, in the case in which a CMA of the CMPK x is referred to, the CMA is referred to as a CMA x. Moreover, in the case in which a DRAM of the CMPK x is referred to, the DRAM is referred to as a DRAM x. Furthermore, in the case in which a battery of the CMPK x is referred to, the battery is referred to as a BAT.x.

Figure 3:
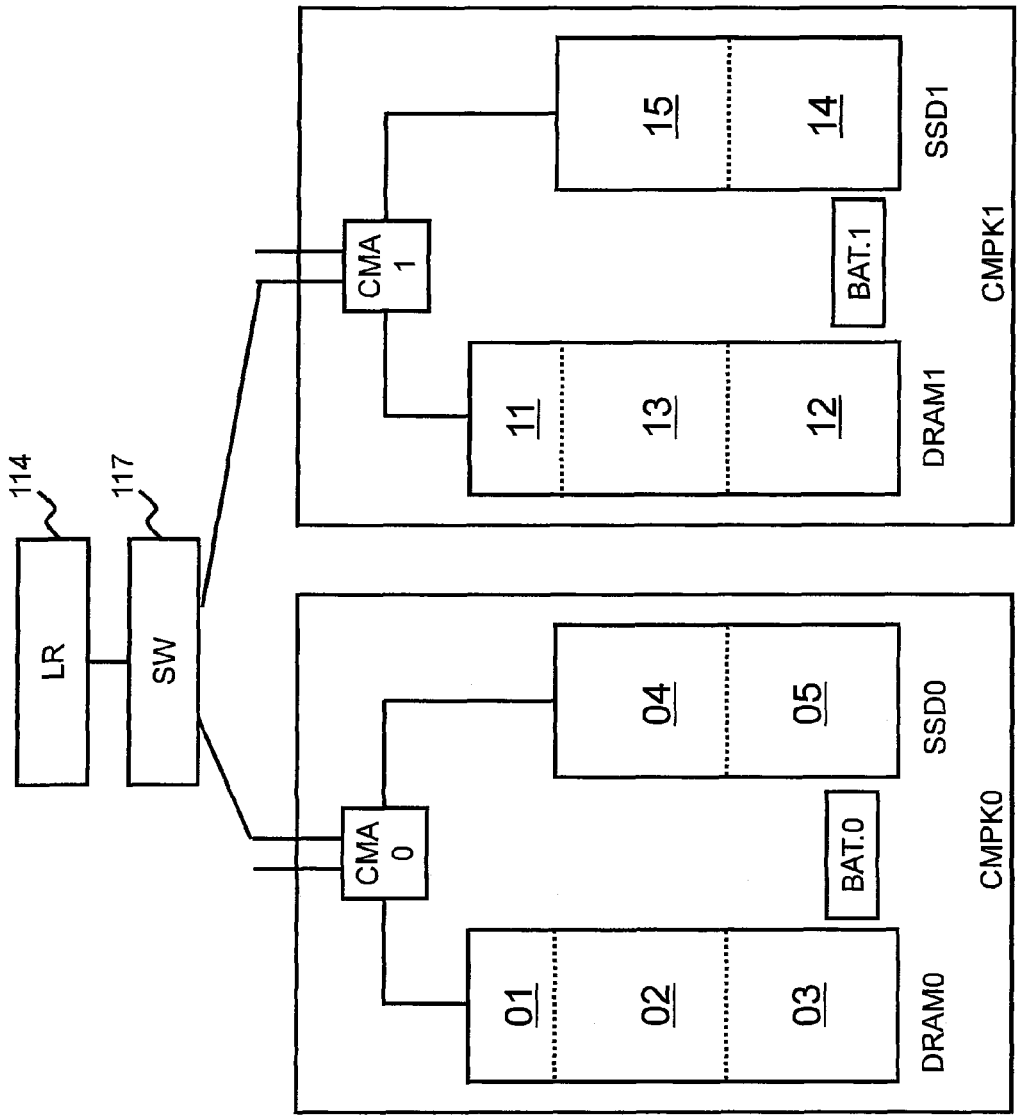
FIG. 3 shows a memory configuration of a CMPK 0 and a CMPK 1 in accordance with the embodiment 1.

FIG. 3 shows a memory configuration of a CMPK 0 and a CMPK 1 in accordance with the embodiment 1.

The DRAM x is configured by an area that is used as a buffer (hereafter referred to as a buffer area) and the cache area described above. More specifically, the DRAM x is provided with three kinds of areas x1, x2, and x3. The area x1 is a buffer area. The area x2 is a half of the cache area of the DRAM x. The area x3 is the other half of the cache area of the DRAM x.

The SSD x is provided with two kinds of areas x4 and x5. The area x4 is an area to which data is backed up from the area x1 during a power distribution (while an electrical power is supplied from the power supply unit 100 to the DRAM x and the CMA x). The area x5 is an area to which data is backed up from the area x3 during a power stoppage. A capacity of the area x5 is equivalent to that of the area x3. The SSD x is provided with a flash memory, and an I/O to the SSD x is executed based on the address management information that indicates a correspondence relationship between a logical address and a physical address. A wear leveling is executed for the SSD x as needed. Consequently, a physical address corresponded to a logical address may vary in some cases.

As one feature of the present embodiment, the DRAM x is provided with a buffer area x1 in addition to the cache area (areas x2 and x3). A capacity of the SSD x is equivalent to that of the cache area. Consequently, a capacity of the SSD x can be less than that of the DRAM x (in other words, a capacity of the DRAM x is larger than that of the SSD x for a capacity of the buffer area).

Figure 4:
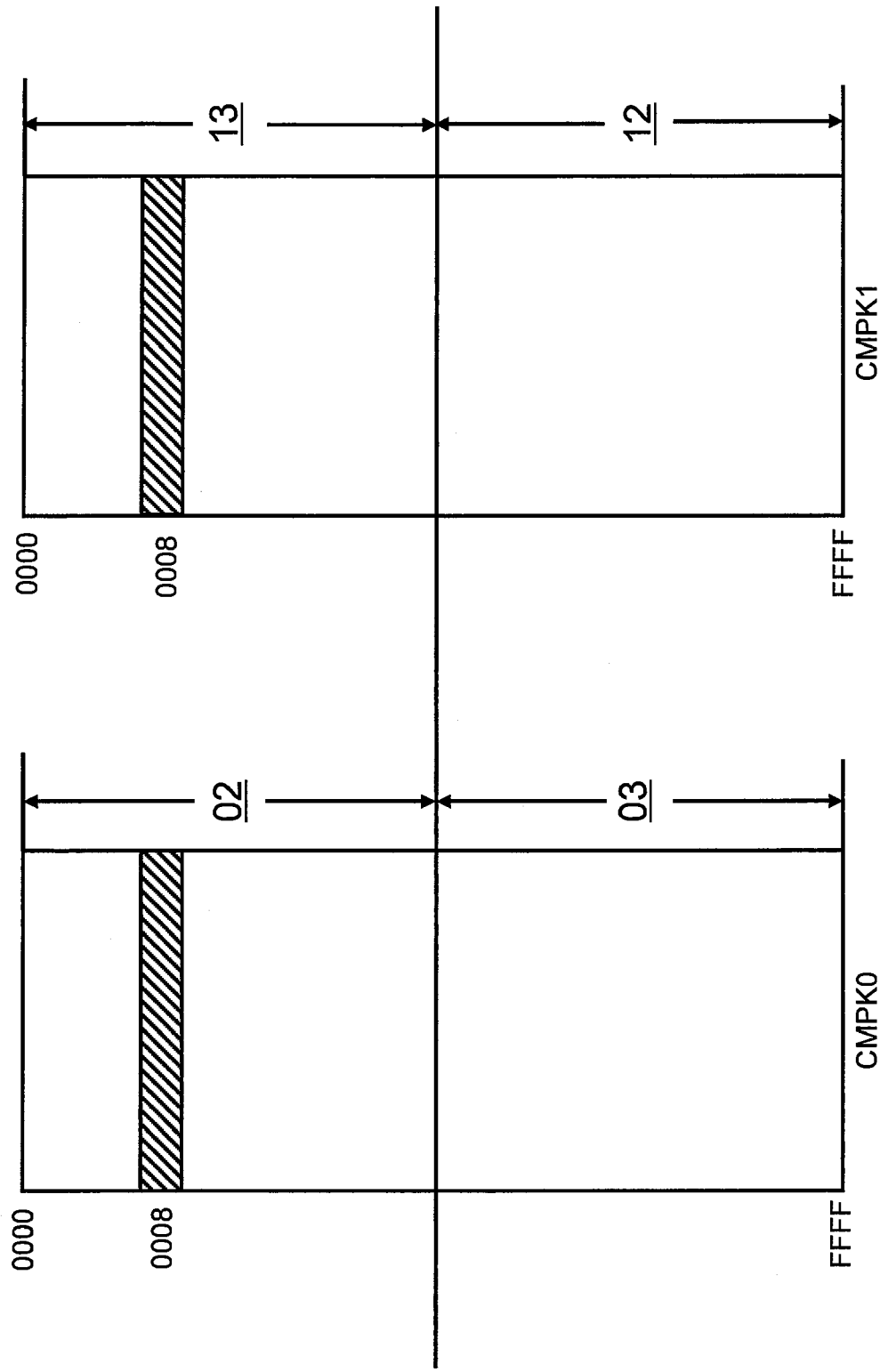
FIG. 4 shows an example of an address range of a CMPK x and an address area relationship that is a relationship between areas x2 and x3 (x=0 or 1).

FIG. 4 shows an example of an address range of a CMPK x and an address area relationship that is a relationship between areas x2 and x3.

In accordance with the example of FIG. 4, there is a common address range, areas 02 and 13 are assigned to the upper half of the address range, and areas 03 and 12 are assigned to the lower half of the address range.

For the present embodiment, to prevent a data loss caused by a single point of failure, a double write to the CMPK 0 and CMPK 1 and a data backup from the DRAM x to the SSD x are executed.

FIG. 5 shows a flow of a double write and a backup in accordance with the embodiment 1. FIG. 6 is a flowchart showing a double write to the CMPK 0 and the CMPK 1 and an asynchronous backup during a power distribution. FIG. 7 is a flowchart showing a backup during a power stoppage in accordance with the embodiment 1. A flow of a double write and a backup will be described in the following by using FIGS. 5 to 7 and the address area relationship shown in FIG. 4.

(S61 of FIG. 6)

The CHA 111 Receives a Write Command that Includes the Write destination information from the HOST 101. The write destination information includes a LUN and an LBA for instance.

An LR 114 of the CHA111 transmits a write command to an MPPK 121 provided with an MP in charge of an LU (Logical Unit) that is identified by the LUN (hereafter referred to as a charged MP) (the LU is a logical storage device that is provided based on one or a plurality of HDDs 105 for instance). The charged MP receives a write command. The charged MP notifies a protocol chip 112 of the CHA 111 of a transmission source of a write command that a write command is received. The protocol chip 112 responds to the notice, and returns a response to the HOST 101 of a transmit source of a write command. The HOST 101 receives the response, and transmits the write target data (hereafter referred to as write data) according to the write command. The protocol chip 112 of the CHA 111 receives the write data, and writes the write data to a storage resource (such as a memory) not shown in the CHA111. The protocol chip 112 notifies the charged MP that writing of the write data has been completed.

(S62 of FIG. 6)

The charged MP responds to the notice of the completion, decides a cache address for a double write, and activates a transmission. More specifically, the charged MP notifies the LR 114 in the CHA111 that has received the write command of two write destination addresses according to the cache address. The two write destination addresses are an address of an area 02 and an address of an area 13, or an address of an area 03 and an address of an area 12. In the following descriptions, as shown by an example of FIG. 4, 0008 is decided as a cache address, whereby the LR 114 is notified of an address of an area 02 and an address of an area 13.

(S11 of FIG. 5)

By the Activation of a Transmission by the Charged MP, the LR 114 transmits a packet that includes an address of an area 02 and the write data in the above storage resource to the CMA 0, and transmits a packet that includes an address of an area 13 and the same write data to the CMA 1. Subsequently, the processes of S63, S64, S65, and S66 of FIG. 6 will be executed.

(S63 of FIG. 6) The CMA 0 analyzes an address in a packet from the LR 114. In the case in which the CMA 0 detects that the address is an address of an area 02, the CMA 0 writes the packet itself not to the area 02 but to the area 01, and returns a completion response to the LR 114.

(S64 of FIG. 6) The CMA 1 analyzes an address in a packet from the LR 114. In the case in which the CMA 1 detects that the address is an address of an area 13, the CMA 1 writes the write data in the packet to the area 13, and returns a completion response to the LR 114.

(S65 of FIG. 6) The LR 114 receives two completion responses (the completion response from the CMA 0 and the completion response from the CMA 1), and notifies the charged MP of a write completion.

(S66 of FIG. 6) The charged MP responds to the write completion notice, and transmits a write completion response to the HOST 101 via the CHA 111 of a transmission source of a write command.

At this point in time, the write data is stored into both of the area 01 of the DRAM 0 and the area 13 of the DRAM 1. The write data that has been stored into the area 01 is transmitted to the SSD 0 during a power distribution (while an electrical power is supplied from the power supply unit 100). The write data that has been stored into the area 13 is backed up to the area 15 during a power stoppage. In other words, two types of backups that are a backup during a power distribution and a backup during a power stoppage are executed as described in detail in the following.

(Backup During a Power Distribution)

The backup during a power distribution is shown by S12 of FIG. 5 and S200 and S201 of FIG. 6. More specifically, a packet that has been stored into the area 01 is read, and the write data in the packet is written to an area of an address corresponded to an address in the packet (an address of the area 02) (an area in the area 04 of the SSD 0). The CMA 0 then releases an area of a read source of the packet (an area in the area 01). By this configuration, a new packet can be stored into the released area.

In the present embodiment, a transmission of the write data from the area 01 to the area 04 is executed in an asynchronous manner with the processing of a write command (for instance, a double write). However, the transmission can also be executed in synchronization with the processing of a write command.

In the above example, since the two write destination addresses that have been specified by a double write are an address of the area 02 and an address of the area 13, the write data is written to the area 01 and the area 13. In the case in which an address that has been decided by the charged MP is an address that is included in the lower half of the cache address range, an address of the area 03 and an address of the area 12 are specified for the double write. Consequently, the write data is written to the area 03, and the write data and a packet that includes an address of the area 12 are written to the area 11. In this case, the write data in a packet that has been written to the area 11 is written to an area (an area in the area 14) of an address corresponded to an address in the packet (an address in the area 12) during a power distribution. Consequently, a plurality of addresses that are included in the area 02 and a plurality of addresses that are included in the area 04 can be corresponded to each other on a one-on-one basis in advance for the CMA 0. Similarly, a plurality of addresses that are included in the area 12 and a plurality of addresses that are included in the area 14 can be corresponded to each other on a one-on-one basis in advance for the CMA 1. By the above configuration, based on an address that is included in a packet in the area 01 or the area 11, a transmission destination of the write data in the packet can be specified uniquely.

In accordance with the above example, the write data that has been written to the area x3 is not backed up to the SSD x5 during a power distribution. In the case in which the write data is not written to the HDD 105, a sub area (an area in the area x3) into which the write data has been stored is managed by the MP as dirty (a sub area that includes the data that has been unwritten to the HDD 105). The MP writes the data in the sub area of dirty for the area x3 to the HDD 105 according to the write destination that has been specified by a write command corresponded to the data in an asynchronous manner with the processing of the write command (in other words, a destage is executed). A sub area that includes the data that has been written to the HDD 105 (an area in the area x3) is managed as clean (a sub area that includes the data that has been written to the HDD 105).

In the case in which the MP receives a read command from the HOST 101 via the CHA 111, the MP judges whether a cache hit has been executed or not. In the case in which a cache hit has been executed, the data (the read data) according to the read command is read from not the HDD 105 but the CMPK 0 or the CMPK 1, and is transmitted to the HOST 101. The "cache hit" means that the data (the read data) that has been stored into an area (an area in the LU) that is specified by the read source information that is included in the received read command (for instance, information that includes the LUN and the LBA) exists in the CMPK 0 or the CMPK 1. In accordance with the present embodiment, one of the double write data exists in the SSD x, and the other exists in the DRAM x. In general, the I/O performance of the DRAM x is more excellent as compared with that of the SSD x. Consequently, in the present embodiment, to suppress the throughput degradation for the processing of the read command, the read data is read from the DRAM x in principle, and is read from the SSD x with the exception (in the case in which one of the CMPK 0 and the CMPK 1 is blocked for instance). Moreover, in the present embodiment, data that can be the read data is distributed to the DRAM 0 and the DRAM 1 (for instance, the area 03 and the area 13). Consequently, it can be expected that a concentration of read to one DRAM is prevented.

In accordance with the above descriptions, although an address of the area x2 is specified during the double write, the write data is not written to the area x2. Consequently, at least one of the following (K1) to (K3) can be adopted for the area x2:

(K1) It is possible that the area x2 is not included in the cache area x.

(K2) The area x2 can be used as an area that stores the data that does not require a backup (clean data more specifically) (hereafter referred to as a clean dedicated area). The "clean data" is data that has been stored into the HDD 105. By the above configuration, the cache area includes a larger amount of clean data, whereby a probability of a cache hit is increased. In this case, it is necessary that an address of an area other than the area x2 is prepared in the cache address range described earlier (see FIG. 4) and that the area x2 is corresponded to the address of the area other than the area x2. This is because data is stored into the area 01 in the case in which an address of the area x2 is specified.

(K3) The area x2 can include both of an extended area of the buffer area x1 and the clean dedicated area.

(Backup During a Power Stoppage)

The backup during a power stoppage is shown by S13 of FIG. 5 and FIG. 7. More specifically, an electrical power supply from the BAT.0 to the DRAM 0 and the CMA 0 is started in the case in which a power stoppage occurs. Similarly, an electrical power supply from the BAT.1 to the DRAM 1 and the CMA 1 is started. The CMA 0 backs up all data that has been stored into the area 03 to the area 05 based on the electrical power from the BAT.0 (S71 of FIG. 7). Similarly, the CMA 1 backs up all data that has been stored into the area 13 to the area 15 based on the electrical power from the BAT.1 (S72 of FIG. 7). Moreover, there is a possibility that the data of which a backup from the area x1 to the area x4 has not been completed exists in the area x1 during a power stoppage. Consequently, the CMA x backs up at least data of which a backup has not been completed among data that has been stored into the area x1 to the area x4 based on an electrical power supplied from the BAT.x during a power stoppage.

A plurality of addresses that are included in the area 03 and a plurality of addresses that are included in the area 05 can be corresponded to each other on a one-on-one basis in advance for the CMA 0. Similarly, a plurality of addresses that are included in the area 13 and a plurality of addresses that are included in the area 15 can be corresponded to each other on a one-on-one basis in advance for the CMA 1. In other words, an area of a backup source and an area of a backup destination in a power stoppage can be corresponded to each other on a one-on-one basis.

As described above, two types of backups, that are, a backup during a power distribution and a backup during a power stoppage are executed, whereby the dirty data for the DRAM 0 and the DRAM 1 can be stored. Even in the case in which a failure occurs for any one of the SSD 0 and the SSD 1 after a backup during a power stoppage is completed, data can remain in the other one of the SSD 0 and the SSD 1.

FIG. 8 is a flowchart showing a restore that is executed during a power recovery.

The CMA 0 restores all data that has been stored into the area 05 to the area 03 during a power recovery (when an electrical power supply from the power supply unit 100 to the DRAM x and the CMA x is restarted) (S81). Similarly, the CMA 1 restores all data that has been stored into the area 15 to the area 13.

In the present embodiment, the data in the area x1 is backed up to the area x4 during a power distribution. Consequently, only data in the area x3 of a part of the cache area x can be backed up (copied) to the area x5 during a power stoppage. By this configuration, a capacity of the BAT.x can be suppressed as compared with a backup of all data in the DRAM to the SSD for instance.

Moreover, in the present embodiment, only data in the area x5 can be restored (copied) to the area x3 during a power recovery.

By this configuration, a time required for a recovery can be suppressed.

In the present embodiment, data that is backed up during a power stoppage can be only dirty data of data in the area x3. In this case, data that is restored during a power recovery can be only data that has been the dirty data in the area x3.

Embodiment 2

An embodiment 2 of the present invention will be described below in detail. In the following, points that are different from the embodiment 1 will be described mainly, and the detailed descriptions of points equivalent to the embodiment 1 are omitted or simplified.

Figure 9:
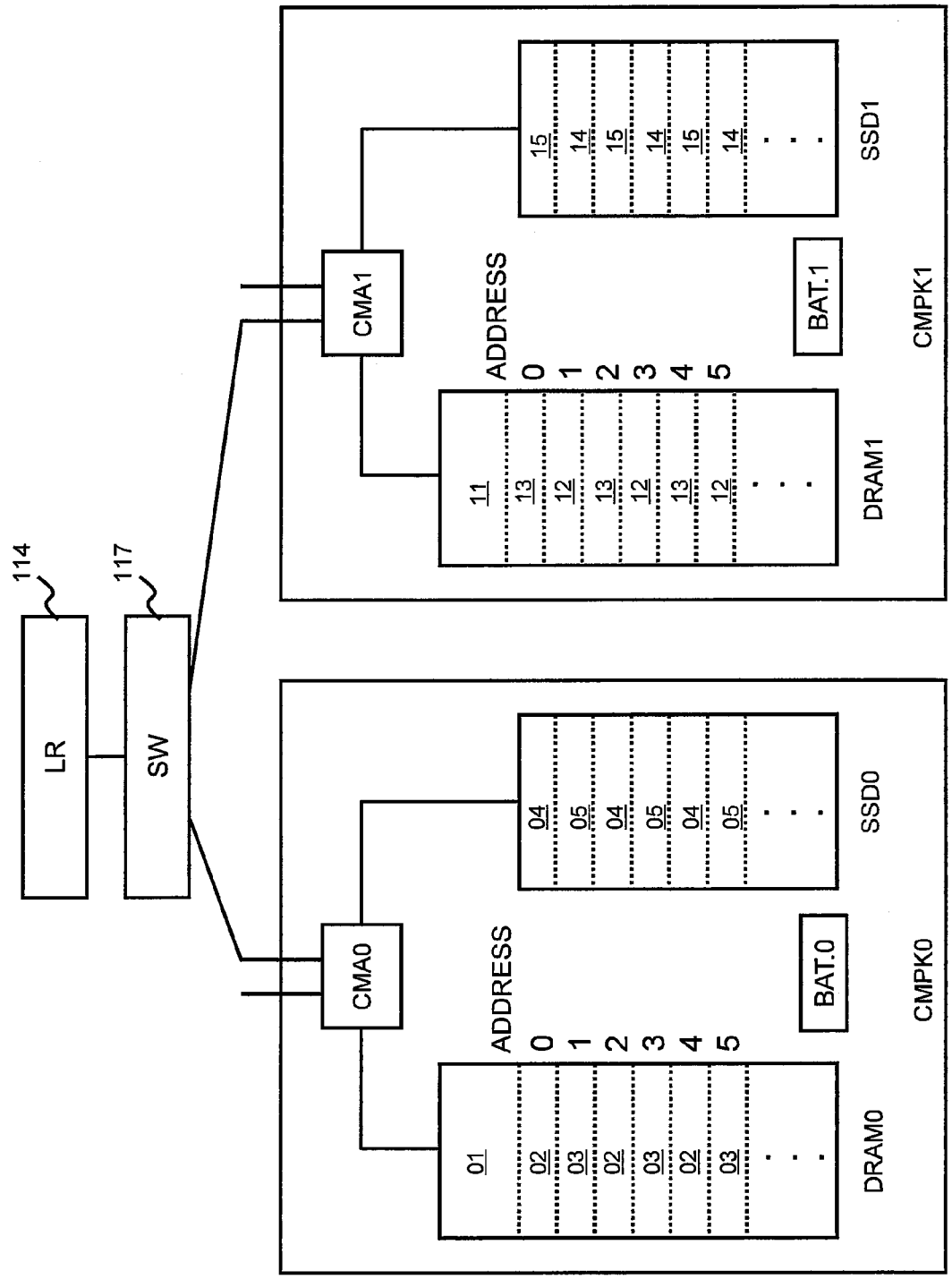
FIG. 9 shows a memory configuration of a CMPK 0 and a CMPK 1 in accordance with an embodiment 2 of the present invention.

FIG. 9 shows a memory configuration of a CMPK 0 and a CMPK 1 in accordance with the embodiment 2.

In the cache address range, an address range to which the area 13 is assigned (hereafter referred to as a first address range) and an address range to which the area 03 is assigned (hereafter referred to as a second address range) are arranged in alternate shifts. More specifically, the area 13 and the area 02 are corresponded to the first address range, and the area 03 and the area 12 are corresponded to the second address range. In other words, the areas of the same type (02 and 12, 03 and 13) for the cache areas 0 and 1 are not corresponded to one address range, and the areas of the different types (02 and 13, 03 and 12) for the cache areas 01 and 1 are corresponded to one address range. One address range includes at least one address. In the present embodiment, since the number of addresses that are included in one address range is one, an address range and an address are synonymous. More specifically, an even address is a first address, and an odd address is a second address.

By the above configuration of the cache address range, even in the case in which a write that specifies continuous addresses in the cache address range (a sequential write) occurs, a write is distributed to both of the areas 01 and 11 of the DRAMs 0 and 1. Consequently, a probability of that a write is concentrated to the area 01 or 11 to fill the area 01 or 11 can be reduced. In addition, in the case in which a sequential write continues for a while, the area x1 is saturated at any point in time. In the present embodiment 2, it is expected that a time length that is required for a write of data in the case in which the area x1 is saturated can be reduced to (time that is required for a write to the DRAM x+time that is required for a write to the SSD x)/2. In the embodiment 1 for comparison, it is thought that a time length that is required for a write of data in the case in which the area x1 is saturated is a time length that is required for writing data having a size equivalent to that of the write target data to the SSD x. This is because a free area in which the write target data can be written cannot be prepared in the area x1 in the case in which data having a size equivalent to that of the write target data is not transmitted from the area x1 to the SSD x.

Figure 10:
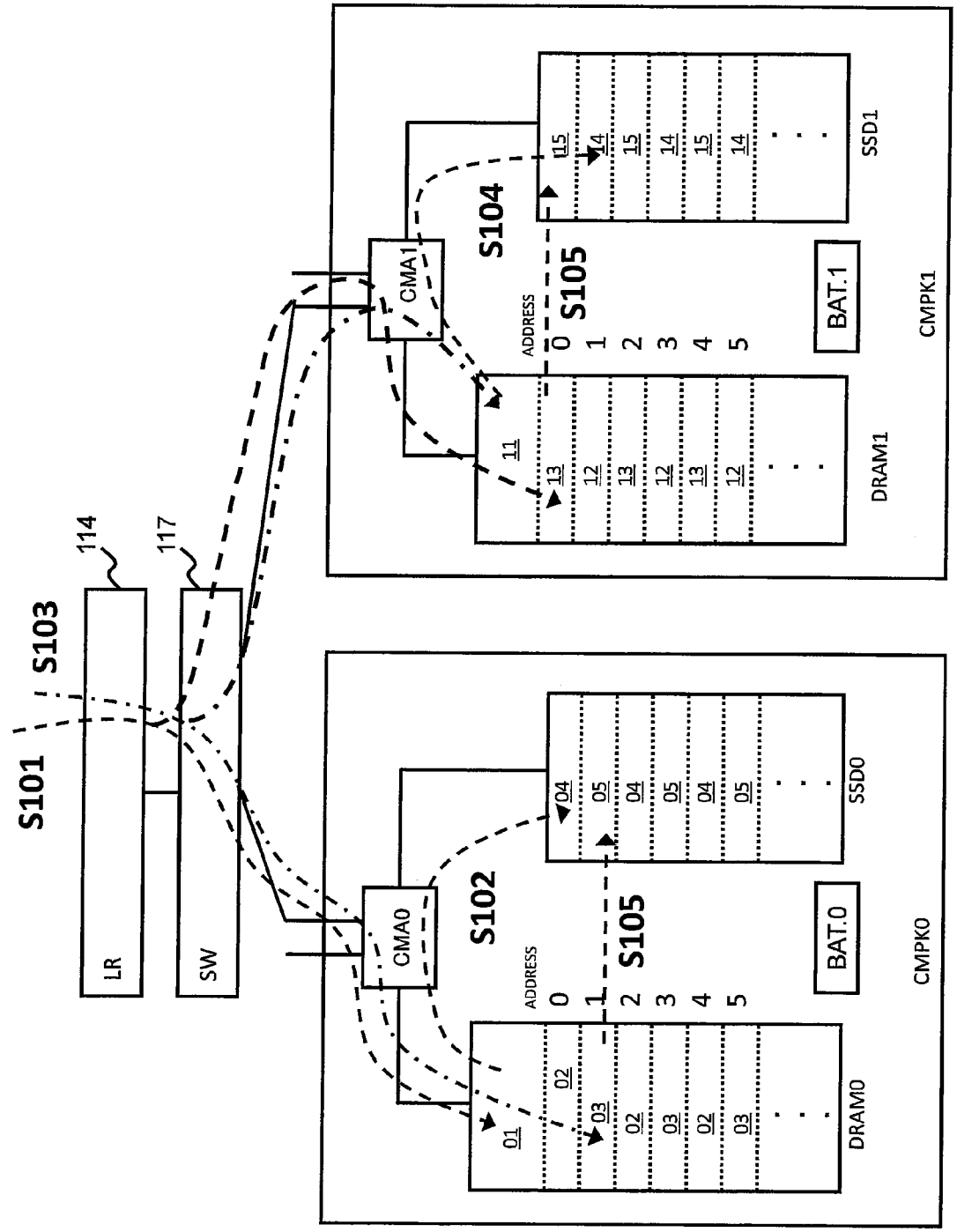
FIG. 10 shows a flow of a double write and a backup in accordance with the embodiment 2.

A flow of a double write and a backup in accordance with the present embodiment will be described in the following with reference to FIG. 10.

For instance, the MP (charged MP) that has received a write command decides the continuous addresses 0 and 1 as a write destination. In this case, a double write of S101 and a backup of S102 are executed for the address 0 of the continuous addresses, and a double write of S103 and a backup of S104 are executed for the address 1.

More specifically, in S101, the CMA 0 and the CMA 1 receive a packet that includes an address and the write data from the LR 114. An address in a packet that is received by the CMA 0 is an address of the area 02 corresponded to the address 0. Since the CMA 0 detects that the address in the packet is an address of the area 02, the CMA 0 writes the packet to the area 01. On the other hand, an address in a packet that is received by the CMA 1 is an address of the area 13 corresponded to the address 0. Since the CMA 1 detects that the address in the packet is an address of the area 13, the CMA 1 writes the write data in the packet to the area 13 that is indicated by the address in the packet. In S102, the CMA 0 writes the write data in a packet in the area 01 to the area 04 that is indicated by an address corresponded to the address in the packet (an address of the area 02).

In S103, the CMA 0 and the CMA 1 also receive a packet that includes an address and the write data from the LR 114. An address in a packet that is received by the CMA 0 is an address of the area 13 corresponded to the address 1. Since the CMA 0 detects that the address in the packet is an address of the area 03, the CMA 0 writes the write data in the packet to the area 03 that is indicated by the address in the packet. On the other hand, an address in a packet that is received by the CMA 1 is an address of the area 12 corresponded to the address 1. Since the CMA 1 detects that the address in the packet is an address of the area 12, the CMA 1 writes the packet to the area 11. In S104, the CMA 1 writes the write data in a packet in the area 11 to the area 14 that is indicated by an address corresponded to the address in the packet (an address of the area 12).

In S105, the CMA 0 backs up the write data in the area 03, which has been stored in S103, to the area 05 corresponded to the area 03 during a power stoppage. Similarly, the CMA 1 backs up the write data in the area 13, which has been stored in S101, to the area 15 corresponded to the area 13. A timing in which a backup is started by the CMA 0 during a power distribution and a timing in which a backup is started by the CMA 1 during a power distribution can be equivalent or can be different (this is similar for the embodiment 1 and an embodiment 3 described later).

As described above, in accordance with the embodiment 2, even in the case in which a write that specifies continuous addresses in the cache address range (a sequential write) is executed, a write is distributed to both of the buffer areas 01 and 11. Consequently, it is possible to reduce a probability of that the buffer area 01 or 11 is filled and the throughput for the processing of a write command is degraded.

A flow of processing that is executed in the case in which a write command is received, a flow of a backup that is executed in normal times, a flow of a backup that is executed during a power stoppage, and a flow of a restore that is executed during a power recovery for the embodiment 2 are substantially equivalent to those for the embodiment 1.

Moreover, in the embodiment 2, a first address range and a second address range are arranged in alternate shifts for the cache address range (a common address range). However, it is not necessarily the case that the address ranges are arranged in alternate shifts. For instance, at least one of the first address range and the second address range should be distributed for the cache address range. More specifically, the first address range can be disposed between the second address ranges, and/or the second address range can be included in the first address range. In other words, there should be at least one of a plurality of the first address ranges and a plurality of the second address ranges.

Furthermore, a plurality of the first address ranges and a plurality of the second address ranges exist in the embodiment 2. However, the capacities of areas (areas in cache areas) that are corresponded to address ranges can be equivalent to or different from each other. For instance, in the embodiment 2, the capacities of areas x2, x3, x4, and x5 are equivalent to each other, and are the unit size (for instance, 528 bytes) of data that is transmitted or received in the storage control apparatus (between packages).

Embodiment 3

An embodiment 3 of the present invention will be described below in detail.

Figure 11:
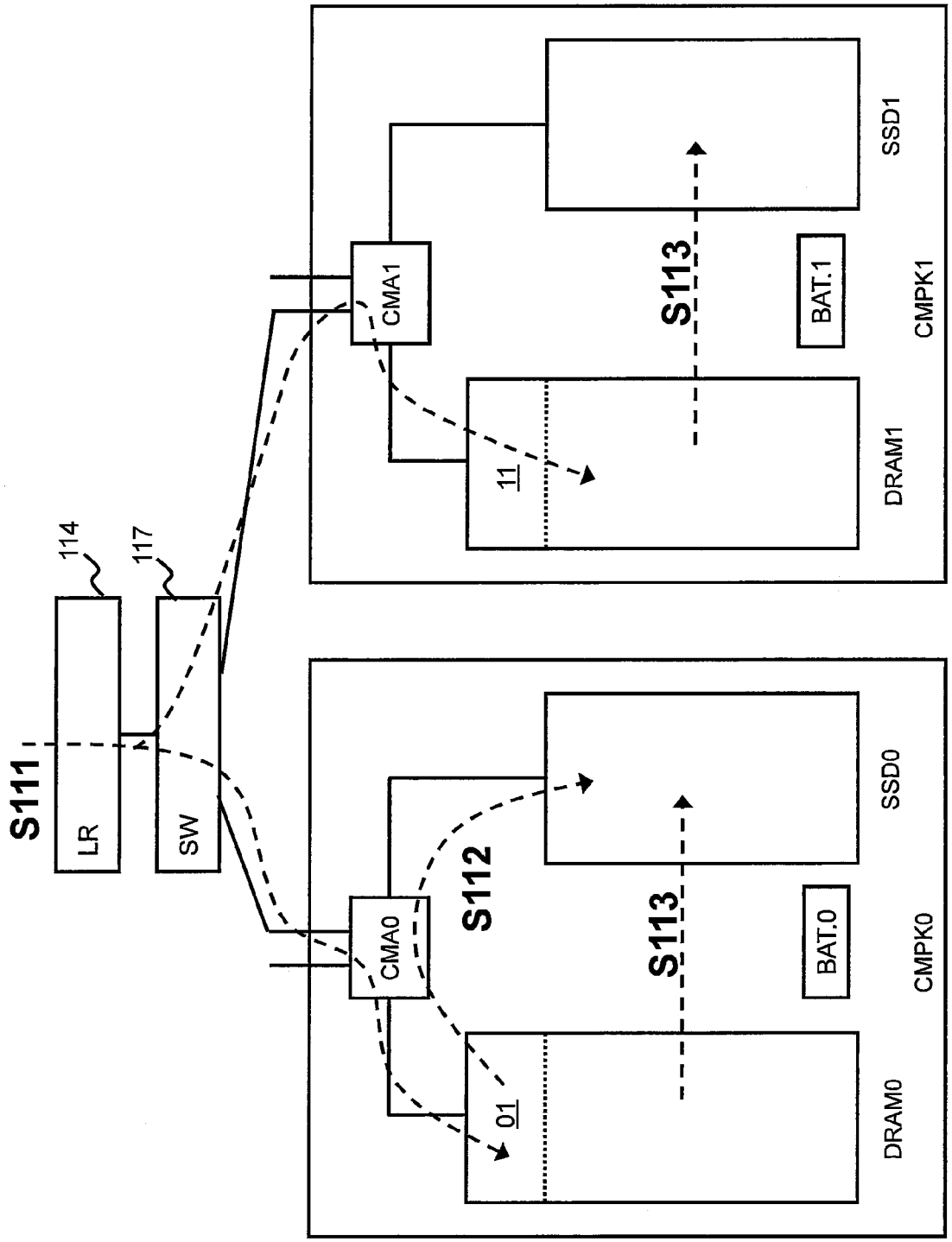
FIG. 11 shows a flow of a double write and a backup in accordance with an embodiment 3 of the present invention.

FIG. 11 shows a flow of a double write and a backup in accordance with an embodiment 3 of the present invention.

In the embodiment 3, the cache area x does not include the areas x2 and x3 unlike the embodiments 1 and 2, whereby the SSD x does not include the areas x4 and x5.

A flow of a double write of the embodiment 3 is equivalent to that of the embodiment 1. However, in the embodiment 3, an address of the SSD x is specified in the case in which the write data is written to the area x1. More specifically, the cache address range includes the first address range and the second address range. In the case in which the charged MP decides an address that is included in the first address range, the charged MP specifies an address of the SSD 0 and an address of a cache area of the DRAM 1 to the LR 114. On the other hand, in the case in which the charged MP decides an address that is included in the second address range, the charged MP specifies an address of the SSD 1 and an address of a cache area of the DRAM 0 to the LR 114.

The flow of a double write and a backup will be described in the following while the case in which an address of the SSD 0 and an address of a cache area of the DRAM 1 are specified to the LR 114 is adopted as an example. In the present embodiment, a correspondence relationship between each address for a cache area of the DRAM x and each address for the SSD x is defined to the CMA x in advance. In other words, a sub area (an area in a cache area) of a backup source and a restore destination and a sub area (an area in the SSD x) of a backup destination and a restore source are corresponded to each other on a one-on-one basis for the CMA x.

(S111) The LR114 transmits a packet that includes an address of the SSD 0 and the write data to the CMA 0, and transmits a packet that includes an address of a cache are of the DRAM 1 and the write data to the CMA 1. In the case in which the CMA 0 detects that an address in a packet from the LR 114 is an address of the SSD 0, the CMA 0 writes the packet to the area 01. In the case in which the CMA 1 detects that an address in a packet from the LR 114 is an address a cache are of the DRAM 1, the CMA 1 writes the write data in the packet to a sub area that is indicated by the address in the packet (an area in a cache area of the DRAM 1).

(S112) A backup during a power distribution is executed. In other words, the CMA 0 writes the write data in the packet in the area 01 to a sub area that is indicated by the address in the packet (an area in the SSD 0).

(S113) A backup during a power stoppage is executed. In other words, the CMA 0 backs up only the dirty data of data in a cache area of the DRAM 0 to a sub area (an area in the SSD 0) corresponded to a sub area that stores the dirty data (an area in a cache area of the DRAM 0). Similarly, the CMA 1 backs up only the dirty data of data in a cache area of the DRAM 1 to a sub area (an area in the SSD 1) corresponded to a sub area that stores the dirty data (an area in a cache area of the DRAM 1).

In the present embodiment, data that is backed up from the DRAM x to the SSD x for a backup during a power stoppage is only the dirty data of data that has been stored into the DRAM x. Similarly, data that is restored from the SSD x to the DRAM x for a restore during a power recovery is only the dirty data that has been backed up from the DRAM x among data that has been stored into the SSD x.

In the present embodiment, a cache management table that indicates an attribute for every address (for every sub area) of the DRAM x and the SSD x for every CMPK x is managed (the information that is included in the cache management table can also be managed by a data structure other than a table structure).

Figure 12:
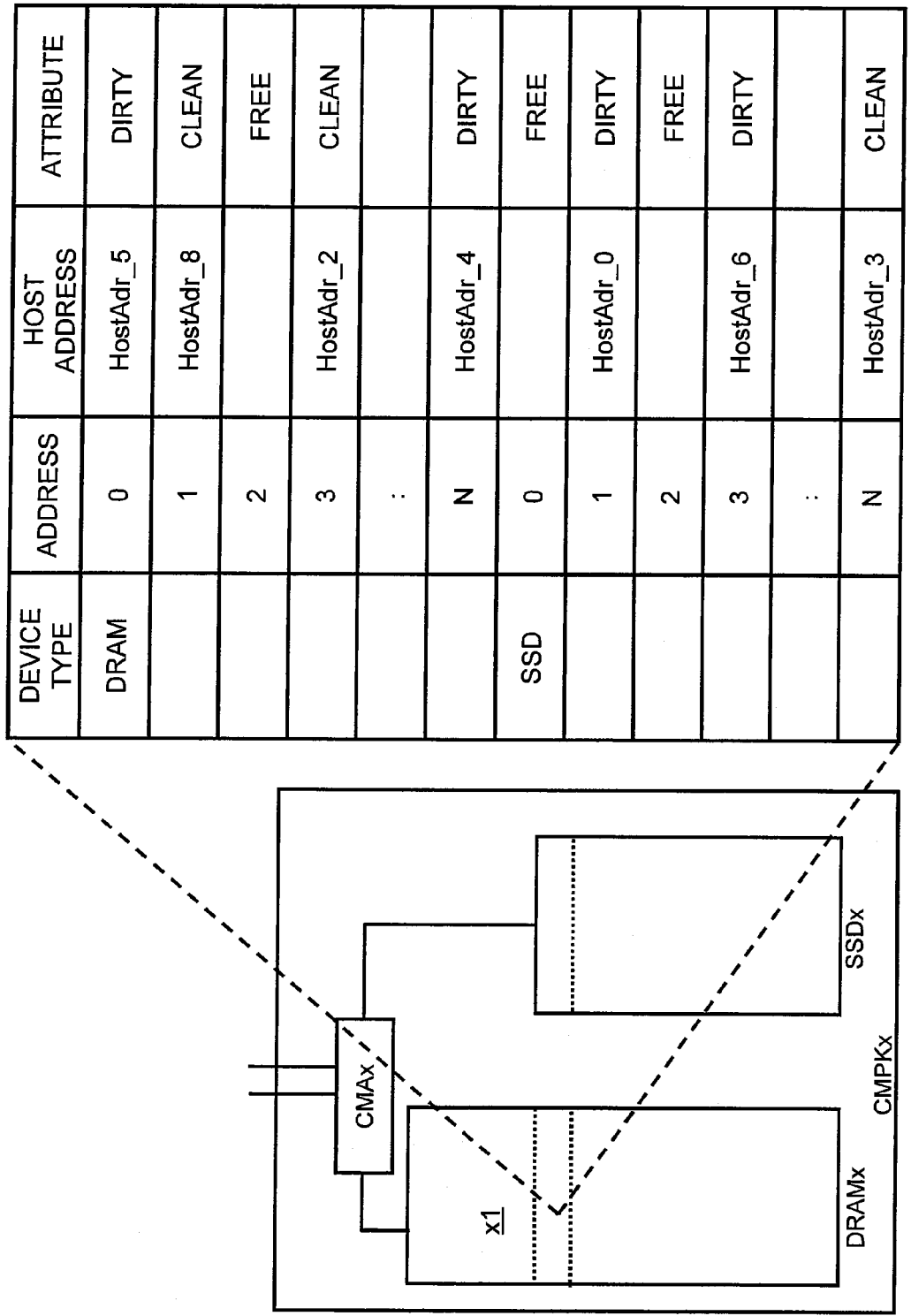
FIG. 12 shows a cache management table of a CMPK x.

FIG. 12 shows a cache management table of a CMPK x.

A cache management table 1201 includes a device type, an address, a host address, and an attribute for every sub area.

The device type indicates whether a memory that includes a sub area is the DRAM or the SSD.

The address is an address of a sub area (an address of the DRAM x or the SRAM x).

The host address is an address of an area that stores data that has been stored into a sub area. More specifically, the host address indicates to which area (LBA) of the LU and from which HOST 101 the data that has been stored into the sub area is stored for instance. In the case in which the data that has been stored into the sub area is the read data, the host address corresponds to an address of a read source area of the read data (for instance, an area in the LU).

The attribute is an attribute of a sub area. As an attribute of a sub area of the DRAM, there can be mentioned for instance dirty, clean, and free (hereafter referred to as dirty (D), clean (D), and free (D)). As an attribute of a sub area of the SSD, there can be mentioned for instance dirty, clean, and free (hereafter referred to as dirty (S), clean (S), and free (S)).

The dirty (D) is an attribute that means a sub area that has stored the data (dirty data) that has not yet been written to the HDD 105.

The clean (D) is an attribute that means a sub area that has stored the data (clean data) that has been written to the HDD 105.

The free (D) is an attribute that means a free sub area.

The dirty (S) is an attribute that means a sub area that has stored the data that has been backed up from the buffer area x1.

The clean (S) is an attribute that means a sub area that has stored the clean data. Moreover, the clean data that has been stored into the sub area x the clean (S) can be data that is not included in the DRAM x. In this case, a probability of that a cache hit is decided in a cache hit judgment that is executed in the case in which the MP receives a read command is increased for instance. This is because the read target clean data is included in the SSD x even in the case in which the read target clean data is not included in the DRAM x.

The free (S) is an attribute that means a free sub area.

A sub area of an attribute (dirty, clean, and free) (D) or (S) is indicated by a combination of a name of an attribute and a sub area (D) or (S) in the following. For instance, a dirty sub area (D) and a dirty sub area (S) may be indicated in some cases. Similarly, an address that indicates the sub area may be indicated by a combination of a name of an attribute and a sub area (D) or (S). For instance, a dirty address (D) and a dirty address (S) may be indicated in some cases. Whether a sub area and an address are of the DRAM or the SSD can be distinguished by the indication of [(D)] (DRAM) and [(S)] (SSD).

The cache management table x can be stored into any storage resource in the storage system 103. In the present embodiment, the cache management table x is stored into the DRAM x. More specifically, for instance, the cache management table x is stored into one area in a cache area of the DRAM x (for instance, an area that is corresponded to the prescribed area of the SSD x on a one-on-one basis). During a power distribution, the cache management table x is updated as needed according to a write to the DRAM x and the SSD x and a destage from the DRAM x to HDD 105. Moreover, the cache management table x is updated according to a backup during a power stoppage, and the cache management table x that has been updated is backed up from the DRAM x to the prescribed area of the SSD x (for instance, a leading end area).

In the present embodiment, a plurality of sub areas that configure a cache area of the DRAM x and a plurality of sub areas that configure the SSD x are corresponded to each other on a one-on-one basis. The correspondence relationship can be fixed and specified to the CMA x in advance, or can be modified dynamically and managed by the MP or the like.

As an address of the SSD x for a double write, for instance, the MP does not specify an address x (S) corresponded to a dirty address x (D) among a plurality of addresses x (S), and specifies an address x (S) corresponded to a clean address x (D) or a free address x (D). This is because the data in a dirty sub area x (D) is backed up to a sub area x (S) corresponded to the dirty sub area x (D). Consequently, an address of the SSD 0 in S111 of FIG. 11 is an address 0 (S) corresponded to a clean address 0 (D) or a free address 0 (D).

From the similar aspect, as an address of the DRAM x for a double write, for instance, the MP does not specify a free address x (S) (and a clean address x (D)) corresponded to a dirty address x (S) among a plurality of free addresses x (S) (and clean addresses x (D)), and specifies a free address x (D) (and a clean address x (D)) corresponded to a free address x (S) (or a clean address x (D)). This is because the data in a dirty sub area x (D) is backed up to the SSD x during a power stoppage, the data that has not written to the HDD 105 is deleted in the case in which the backup destination is a dirty sub area x (S). Consequently, an address of the DRAM 1 in S111 of FIG. 11 is a free address 0 (D) or a clean address 0 (D) corresponded to a free address 1 (S).

In the present embodiment, the total amount of a dirty sub area x (D) for a cache area x is controlled to be up to half of the cache area x. This is to back up all dirty data (dirty data in the DRAM 0 and the DRAM 1) to both of the SSD 0 and the SSD after a backup during a power stoppage is completed. Consequently, in S111 of FIG. 11 for instance, the MP judges whether or not the total amount of a dirty sub area 1 (D) is up to half of a capacity of the cache area even in the case in which the write data is written to the DRAM 1 based on the cache management table 1 (a dirty write judgment). In the case in which the result of the dirty write judgment is positive, the MP executes a double write. In the case in which the result of the dirty write judgment is negative, the MP can stop a double write as an error for instance, or can reduce the total amount of a dirty sub area 1 (D) by executing destage of the dirty data in the DRAM 1 and then execute the dirty write judgment again.

In the present embodiment, the cache management table x is updated as described in the following for instance:
- In the case in which the write data is written to a sub area of the cache area x, the MP updates an attribute of the sub area to dirty (D).
- In the case in which the write data is newly written after the cache area x is filled and in the case in which an attribute of the sub area (the sub area in the cache area) to be opened is dirty, the MP x executes a destage to the HDD 105 and updates the attribute of the sub area to be free. In the case in which an attribute of the sub area (the sub area in the cache area) to be opened is clean, the MP x updates the attribute of the sub area to be free without executing a destage of data in the sub area. It is not necessary to update an attribute to be free.
- In the case in which the data in a dirty sub area x (D) is destaged, the MP or the CMA x updates an attribute of the sub area from dirty (D) to clean (D).
- In the case in which the write data is backed up from a buffer area x to a free sub area x (S) (or a clean sub area x (S)) for a backup during a power distribution, the MP or the CMA x updates an attribute of the sub area x from free (S) to dirty (S).

Figure 13:
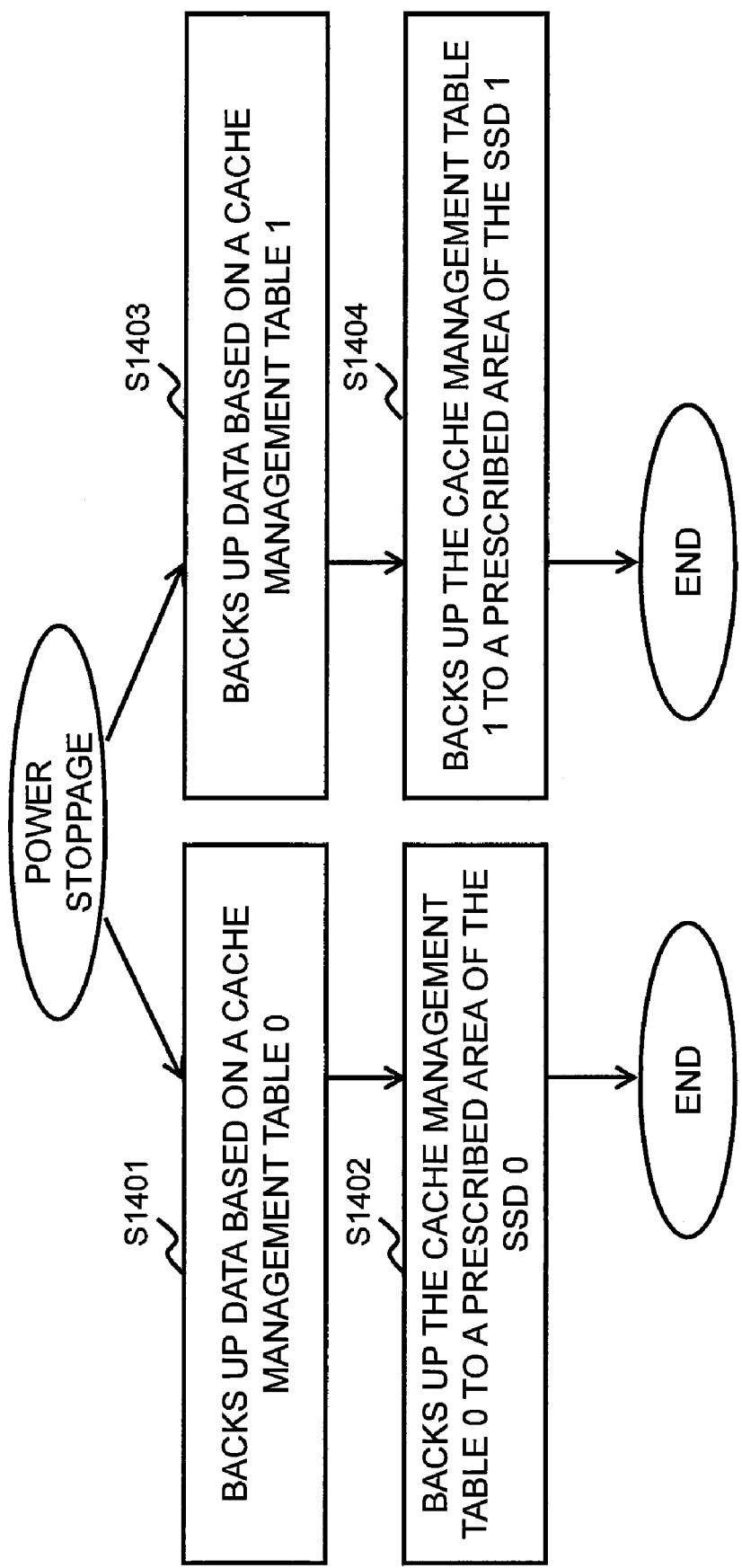
FIG. 13 is a flowchart showing a backup during a power stoppage in accordance with the embodiment 3.

FIG. 13 is a flowchart showing a backup during a power stoppage in accordance with the embodiment 3.

The CMA 0 backs up the dirty data in all the dirty sub areas 0 (D) that are specified by the cache management table 0 to a sub area in the SSD 0 corresponded to the dirty sub area 0 (D) (S1401). The CMA 0 then writes the cache management table 0 to a prescribed area of the SSD 0 (S1402).

Similarly, the CMA 1 backs up the dirty data in all the dirty sub areas 1 (D) that are specified by the cache management table 1 to a sub area in the SSD 1 corresponded to the dirty sub area 1 (D) (S1403). The CMA 1 then writes the cache management table 1 to a prescribed area of the SSD 1 (S1404). Moreover, there is a possibility that the data of which a backup from the buffer area x1 to the SSD x has not been completed exists in the buffer area x1 during a power stoppage. Consequently, the CMA x backs up at least data of which a backup has not been completed among data that has been stored into the buffer area x1 to the SSD x (the free sub area x (S) or a clean sub area x (S)) based on an electrical power supplied from the BAT.x during a power stoppage. At that time, the CMA x or the MP x updates an attribute of the sub area x (S) of the data backup destination (an attribute that has been recorded in the cache management table x) to be dirty (S). The table x after the update is backed up to the SSD x in the S1402 or the S1404.

FIG. 14 is a flowchart showing a restore during a power recovery in accordance with the embodiment 3.

The CMA 0 restores the cache management table 0 from a prescribed area of the SSD 0 to the DRAM 0 (S1501). The CMA 0 then restores data (S1502). More specifically, the CMA 0 specifies a dirty sub area 0 (D) from the cache management table 0 that has been restored, and restores the dirty data from the sub area in the SSD 0 that is corresponded to the dirty sub area 0 (D) that has been specified to a dirty sub area 0 (D). Moreover, the CMA 0 specifies a dirty sub area 0 (S) from the cache management table 0 that has been restored, and restores the dirty data from the dirty sub area 0 (S) that has been specified to the sub area 0 (D) that is corresponded to the dirty sub area 0 (S). In the embodiment 3, as described above, the sub area in the cache area x and the sub area in the SSD x are corresponded to each other on a one-on-one basis in advance.

Similarly, the CMA 1 restores the cache management table 1 from a prescribed area of the SSD 1 to the DRAM 1 (S1503). The CMA 1 then restores data (S1502). More specifically, the CMA 1 specifies a dirty sub area 1 (D) from the cache management table 1 that has been restored, and restores the dirty data from the sub area in the SSD 1 that is corresponded to the dirty sub area 1 (D) that has been specified to a dirty sub area 1 (D). Moreover, the CMA 1 specifies a dirty sub area 1 (S) from the cache management table 1 that has been restored, and restores the dirty data from the dirty sub area 1 (S) that has been specified to the sub area 1 (D) that is corresponded to the dirty sub area 1 (S).

In accordance with the embodiment 3, data that is backed up for a backup during a power stoppage and data that is restored for a restore during a power recovery are only dirty data.

While the preferred embodiments in accordance with the present invention have been described above, the present invention is not restricted to the embodiments, and various changes, modifications, and functional additions can be thus made without departing from the scope of the present invention. For instance, in the embodiments 1 and 2, an address of the SSD x can also be specified as substitute for an address of the area x2 in a double write. Moreover, in the embodiments 1 and 2, providing the areas of the same type (the areas 02 and 12, the areas 03 and 13) are not assigned to the same address for the cache address range, areas can be arranged in the order of the area 02 and the area 03 for the DRAM 0, and areas can be arranged in the order of the area 12 and the area 13 for the DRAM 1.

REFERENCE SIGNS LIST

103: Storage system

The invention claimed is:

1. A storage system that is coupled to a host device, comprising:
   a plurality of physical storage devices; and
   a storage control apparatus that is coupled to the plurality of physical storage devices and the host device,
   the storage control apparatus comprising:
   a first cache memory group provided with a first volatile memory and a first nonvolatile memory;
   a second cache memory group provided with a second volatile memory and a second nonvolatile memory;
   a second secondary power source that supplies an electrical power to the second volatile memory in the case in which an electrical power supply from a primary power source to the second volatile memory is stopped; and
   a controller that is coupled to the first and second cache memory groups, the plurality of physical storage devices, and the host device,
   wherein:
   (A) the controller receives a write command that specifies a write destination from the host device, and executes the following (W1) to (W3):

(W1) receives the write target data according to the received write command from the host device;
(W2) executes a double write for writing the write target data to both of the first volatile memory and the second volatile memory; and
(W3) notifies the host device of a write completion in the case in which the double write is completed,
(B) the controller backs up data from the first volatile memory to the first nonvolatile memory while an electrical power is supplied from the primary power source,
(C) the controller writes the write target data that has been stored into the first nonvolatile memory or the second volatile memory to a physical storage device that is a basis of an area that is specified by a write destination that is specified by the write command that has been received in the above (A) among the plurality of physical storage devices while an electrical power is supplied from the primary power source, and
(D) the controller backs up data from the second volatile memory to the second nonvolatile memory while an electrical power is supplied from the second secondary power source to the second volatile memory in the case in which an electrical power supply from the primary power source is stopped.

2. The storage system according to claim 1, further comprising a first secondary power source that supplies an electrical power to the first volatile memory in the case in which an electrical power supply from a primary power source to the first volatile memory is stopped,
wherein the first volatile memory is provided with first and second volatile areas,
wherein the first nonvolatile memory is provided with first and second nonvolatile areas,
wherein the second volatile memory is provided with third and fourth volatile areas,
wherein the second nonvolatile memory is provided with third and fourth nonvolatile areas,
wherein the controller executes any one of the following (W21) and (W22) in the (W2):
(W21) writes the write target data to the first volatile area, and writes the write target data to the fourth volatile area; and
(W22) writes the write target data to the third volatile area, and writes the write target data to the second volatile area,
wherein, as the processing of the (B), the controller executes a backup of data from the first volatile area to the first nonvolatile area, and executes a backup of data from the third volatile area to the third nonvolatile area,
wherein, as the processing of the (C), the controller writes the write target data that has been stored into the first nonvolatile area or the third volatile area or the write target data that has been stored into the third nonvolatile area or the second volatile area to a physical storage device that is a basis of an area that is specified by an address that is specified by the write command that has been received in the above (A) among the plurality of physical storage devices, and
wherein, as the processing of the (D), the controller executes a backup of data from the second volatile area to the second nonvolatile area while an electrical power is supplied from the first secondary power source to the first volatile memory, and executes a backup of data from the fourth volatile area to the fourth nonvolatile area while an electrical power is supplied from the second secondary power source to the second volatile memory.

3. The storage system according to claim 2, wherein:
(E) in the case in which an electrical power supply from the primary power source is started after the processing of the (D), the controller does not restore data from the first nonvolatile area to the first volatile memory and restores data from the second nonvolatile area to the second volatile area for the first cache memory group, and the controller does not restore data from the third nonvolatile area to the third volatile memory and restores data from the fourth nonvolatile area to the second volatile area for the second cache memory group.

4. The storage system according to claim 3, wherein:
the controller receives a read command that specifies a read source from the host device, and
in the case in which data equivalent to data that has been stored into an area that is specified by the read source for the plurality of physical storage devices exists in both of the first nonvolatile area or the third nonvolatile area, and the second volatile area or the fourth volatile area, the controller reads the equivalent data not from the first nonvolatile area or the third nonvolatile area, but from the second volatile area or the fourth volatile area.

5. The storage system according to claim 4, wherein:
the controller manages a cache memory address range that is a range of an address for the first and second cache memory groups, the cache memory address range includes first and second address ranges,
at least one address is included in each address range,
the fourth volatile area is corresponded to the first address range,
the second volatile area is corresponded to the second address range,
the controller executes the (W21) in the case in which an address that is included in the first address range for the cache memory address range is specified, and executes the (W22) in the case in which the second address for the cache memory address range is specified for the (W2), and
the first address range is disposed between the second address ranges, and/or the second address range is disposed between the first address ranges for the cache memory address range.

6. The storage system according to claim 5, wherein:
the first address range and the second address range are arranged in alternate shifts.

7. The storage system according to claim 2, wherein:
(X) the controller receives a read command that specifies a read source from the host device, and
(Y) in the case in which data equivalent to data that has been stored into an area that is specified by the read source for the plurality of physical storage devices exists in both of the first nonvolatile area or the third nonvolatile area, and the second volatile area or the fourth volatile area, the controller reads the equivalent data not from the first nonvolatile area or the third nonvolatile area, but from the second volatile area or the fourth volatile area.

8. The storage system according to claim 7, wherein:
the first volatile memory includes the fifth volatile area in addition to the first and second volatile areas,
the total amount of the second volatile area and the fifth volatile area is equivalent to a capacity of the first volatile memory,
the second volatile memory includes the sixth volatile area in addition to the third and fourth volatile areas,
the total amount of the fourth volatile area and the sixth volatile area is equivalent to a capacity of the second volatile memory, the controller transfers data that has been written to any one of the plurality of physical storage devices from the second volatile area to the fifth volatile area, and transfers data that has been written to any one of the plurality of physical storage devices from the third volatile area to the sixth volatile area, and in the case in which data equivalent to data that has been stored into an area that is specified by the read source in the (Y) exists in both of the first nonvolatile area or the third nonvolatile area, and the second, fourth, fifth, or sixth volatile area, the controller reads the equivalent data not from the first nonvolatile area or the third nonvolatile area, but from the second, fourth, fifth, or sixth volatile area.

9. The storage system according to claim 2, wherein:

the controller manages a cache memory address range that is a range of an address for the first and second cache memory groups, the cache memory address range includes first and second address ranges, at least one address is included in each address range, the fourth volatile area is corresponded to the first address range, the second volatile area is corresponded to the second address range, the controller executes the (W21) in the case in which an address that is included in the first address range for the cache memory address range is specified, and executes the (W22) in the case in which the second address for the cache memory address range is specified for the (W2), and the first address range and the second address range are arranged in alternate shifts for the cache memory address range.

10. The storage system according to claim 9, wherein:

the size of the fourth volatile area and the fourth nonvolatile area and the size of the second volatile area and the second nonvolatile area are a size of the minimum unit of data that is transmitted from the controller to the first and second cache memory groups.

11. The storage system according to claim 1, further comprising:

a first secondary power source that supplies an electrical power to the first volatile memory in the case in which an electrical power supply from a primary power source to the first volatile memory is stopped, wherein:

the first volatile memory is provided with a first buffer area that is used as a buffer and a first cache area that is used as a cache memory, the second volatile memory is provided with a second buffer area that is used as a buffer and a second cache area that is used as a cache memory, the controller manages the first cache management information for the first cache memory group and the second cache management information for the second cache memory group, the first cache management information is the information that indicates an attribute of each sub area of the first cache area and an attribute of each sub area of the first volatile memory, the second cache management information is the information that indicates an attribute of each sub area of the second cache area and an attribute of each sub area of the second volatile memory, as an attribute of a sub area of each of the first and second cache areas, there are volatile dirty that is an attribute that means a sub area that has stored data that has not been written to any one of the plurality of physical storage devices and volatile clean that is an attribute that means a sub area that has stored data that has been written to any one of the plurality of physical storage devices, as an attribute of a sub area of each of the first and second nonvolatile memories, there is nonvolatile dirty that is an attribute that means a sub area that has stored data that has been backed up from the first or second buffer area, the controller executes the following (w21) or (w22) as the processing of the (W2):

(w21) executes a first double write for writing the write target data to both of the first buffer area and the second cache area, and updates an attribute that is indicated by the first cache management information and that is of a sub area of a write destination of the write target data to volatile dirty; and (w22) executes a second double write for writing the write target data to both of the second buffer area and the first cache area, and updates an attribute that is indicated by the second cache management information and that is of a sub area of a write destination of the write target data to volatile dirty, the controller executes the following (b1) to (b4) as the processing of the (B):

(b1) backs up the write target data from the first buffer area to a sub area in the first nonvolatile memory;

(b2) updates an attribute that is indicated by the first cache management information and that is of a sub area of a backup destination of the (b1) to nonvolatile dirty;

(b3) backs up the write target data from the second buffer area to a sub area in the second nonvolatile memory; and (b4) updates an attribute that is indicated by the second cache management information and that is of a sub area of a backup destination of the (b3) to nonvolatile dirty, as the processing of the (C), the controller writes data that is specified based on the first and second cache management information and that is in a sub area of volatile dirty in the first or second cache area to a physical storage device that is a basis of an area that is specified by the write destination, the controller executes the following (d1) and (d2) as the processing of the (D):

(d1) backs up only the data that is specified based on the first cache management information and that is in a sub area of volatile dirty in the first cache area to the first nonvolatile memory while an electrical power is supplied from the first secondary power source to the first volatile memory; and (d2) backs up only the data that is specified based on the second cache management information and that is in a sub area of volatile dirty in the second cache area to the second nonvolatile memory, (E) in the case in which an electrical power supply from the primary power source is started after the processing of the (D), the controller executes the following (e1) and (e2):

(e1) specifies a sub area of volatile dirty based on the first cache management information, and restores the data from the sub area in the first nonvolatile memory that is corresponded to the sub area of volatile dirty to the sub area of volatile dirty; and (e2) specifies a sub area of volatile dirty based on the second cache management information, and restores the data from the sub area in the second nonvolatile memory that is corresponded to the sub area of volatile dirty to the sub area of volatile dirty, and the sub area in the first and second cache areas that is a write destination of the write target data is a sub area that is corresponded to a sub area in the nonvolatile memory other than the sub area of volatile dirty in the (w21) and (w22).

12. The storage system according to claim 11, wherein:
the controller manages a first relationship that is a correspondence relationship that has been defined in advance between a plurality of sub areas of the first cache area and a plurality of sub areas of the first nonvolatile memory and a second relationship that is a correspondence relationship that has been defined in advance between a plurality of sub areas of the second cache area and a plurality of sub areas of the second nonvolatile memory,
the controller specifies an address of the sub area of the first nonvolatile memory and writes the write target data to the first buffer area, and specifies the sub area in the second cache area corresponded to a sub area other than a sub area of nonvolatile dirty of the second nonvolatile memory based on the second relationship and writes the write target data to the specified sub area for the second cache area in the (w21),
the controller specifies an address of the sub area of the second nonvolatile memory and writes the write target data to the second buffer area, and specifies the sub area in the first cache area corresponded to a sub area other than a sub area of nonvolatile dirty of the first nonvolatile memory based on the first relationship and writes the write target data to the specified sub area for the first cache area in the (w22),
the controller backs up the write target data from the first buffer area to the sub area of the first nonvolatile memory specified in the (w21) in the (b1), and
the controller backs up the write target data from the second buffer area to the sub area of the second nonvolatile memory specified in the (w22) in the (b3).

13. The storage system according to claim 11, wherein:
a capacity of the first cache area, a capacity of the second cache area, a capacity of the first nonvolatile memory, and a capacity of the second nonvolatile memory are equivalent to each other,
the controller writes the write target data to the second cache area in the case in which the total amount of a sub area of volatile dirty for the second cache area is up to half of a capacity of the second cache area even in the case in which the write target data is written to the second cache area in the (w21), and
the controller writes the write target data to the first cache area in the case in which the total amount of a sub area of volatile dirty for the first cache area is up to half of a capacity of the first cache area even in the case in which the write target data is written to the first cache area in the (w22).

14. The storage system according to claim 11, wherein:
the controller writes the first cache management information to the first cache area, and writes the second cache management information to the second cache area,
the controller backs up the first cache management information to the prescribed area of the first nonvolatile memory, and backs up the second cache management information to the prescribed area of the second nonvolatile memory in the case in which an electrical power supply from the primary power source is stopped, and
the controller restores the first cache management information from the prescribed area of the first nonvolatile memory to the first cache area, restores the second cache management information from the prescribed area of the second nonvolatile memory to the second cache area, uses the first cache management information that has been restored in the (e1), and uses the second cache management information that has been restored in the (e2) in the case in which an electrical power supply from the primary power source is started.

15. A storage control apparatus that is coupled to a host device and a plurality of physical storage devices, comprising:
a first cache memory group provided with a first volatile memory and a first nonvolatile memory;
a second cache memory group provided with a second volatile memory and a second nonvolatile memory;
a secondary power source that supplies an electrical power to the second volatile memory in the case in which an electrical power supply from a primary power source to the second volatile memory is stopped; and
a controller that is coupled to the first and second cache memory groups, the host device, and the plurality of physical storage devices, and,
wherein:
(A) the controller receives a write command that specifies a write destination from the host device, and executes the following (W1) to (W3):
(W1) receives the write target data according to the received write command from the host device;
(W2) executes a double write for writing the write target data to both of the first volatile memory and the second volatile memory; and
(W3) notifies the host device of the write completion in the case in which the double write is completed,
(B) the controller backs up data from the first volatile memory to the first nonvolatile memory while an electrical power is supplied from the primary power source,
(C) the controller writes the write target data that has been stored into the first nonvolatile memory or the second volatile memory to a physical storage device that is a basis of an area that is specified by a write destination that is specified by the write command that has been received in the above (A) among the plurality of physical storage devices while an electrical power is supplied from the primary power source, and
(D) the controller backs up data from the second volatile memory to the second nonvolatile memory while an electrical power is supplied from the secondary power source to the second volatile memory in the case in which an electrical power supply from the primary power source is stopped.

16. The storage system according to claim 2, wherein:
as the processing of the (D), the controller further backs up at least data that has not been backed up in the (B) among data that has been stored into the first volatile area to the first nonvolatile area, and backs up at least data that has not been backed up in the (B) among data that has been stored into the third volatile area to the third nonvolatile area.

17. The storage system according to claim 11, wherein:
in the (d1), the controller backs up at least data that has not been backed up to the sub area in the first nonvolatile memory in the (b1) among data that has been stored into the first buffer area to the sub area in the first nonvolatile memory, and updates an attribute of the sub area to be nonvolatile dirty,
in the (d2), the controller backs up at least data that has not been backed up to the sub area in the second nonvolatile memory in the (b3) among data that has been stored into the second buffer area to the sub area in the second nonvolatile memory, and updates an attribute of the sub area to be nonvolatile dirty, in the (e1), the controller specifies a sub area of nonvolatile dirty in the first nonvolatile memory based on the first cache management information, and restores the data from the sub area of nonvolatile dirty to the sub area in the first cache area that is corresponded to the sub area of nonvolatile dirty, and in the (e1), the controller specifies a sub area of nonvolatile dirty in the second nonvolatile memory based on the second cache management information, and restores the data from the sub area of nonvolatile dirty to the sub area in the second cache area that is corresponded to the sub area of nonvolatile dirty.

* * * * *